(12) United States Patent
Natarajan et al.

(10) Patent No.: US 10,448,415 B2
(45) Date of Patent: Oct. 15, 2019

(54) SCHEDULING OF NETWORK RELAYS

(71) Applicant: INTEL CORPORATION, Santa Clara, CA (US)

(72) Inventors: Venkataraman Natarajan, Bangalore (IN); Apoorv Vyas, Bathinda (IN); Jaroslaw J. Sydir, San Jose, CA (US); Kumar Ranganathan, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 147 days.

(21) Appl. No.: 15/646,504

(22) Filed: Jul. 11, 2017

(65) Prior Publication Data

US 2019/0021100 A1    Jan. 17, 2019

(51) Int. Cl.

| H04W 72/12 | (2009.01) |
| H04L 12/24 | (2006.01) |
| H04L 29/08 | (2006.01) |
| H04W 52/02 | (2009.01) |
| H04W 4/38 | (2018.01) |
| H04W 84/18 | (2009.01) |
| H04W 88/16 | (2009.01) |

(52) U.S. Cl.
CPC ..... *H04W 72/1205* (2013.01); *H04L 41/0816* (2013.01); *H04L 67/12* (2013.01); *H04L 67/32* (2013.01); *H04W 4/38* (2018.02); *H04W 52/0203* (2013.01); *H04W 84/18* (2013.01); *H04W 88/16* (2013.01)

(58) Field of Classification Search
CPC .......................... H04W 72/1205; H04L 1/0816
USPC .......................................................... 370/254
See application file for complete search history.

(56) References Cited

U.S. PATENT DOCUMENTS

| 7,405,597 | B1* | 7/2008 | Pitkethly | H03K 19/01721 326/83 |
| 9,727,115 | B1* | 8/2017 | Brown | G06F 1/3203 |
| 2007/0262863 | A1* | 11/2007 | Aritsuka | H04B 17/27 340/539.22 |
| 2008/0062865 | A1* | 3/2008 | Neugebauer | H04W 88/04 370/229 |
| 2014/0316736 | A1* | 10/2014 | Strohbach | H04L 67/12 702/127 |
| 2015/0214955 | A1* | 7/2015 | Calhoun | G06F 1/04 331/47 |
| 2016/0120432 | A1* | 5/2016 | Sridhar | A61B 5/6898 600/544 |
| 2017/0230074 | A1* | 8/2017 | Rose | H04B 1/44 |

(Continued)

*Primary Examiner* — Peter G Solinsky
(74) *Attorney, Agent, or Firm* — Finch & Maloney PLLC (57) ABSTRACT

Techniques disclosed for accurately predicting the occurrence of anomalous sensor readings within a sensor network and advantageously using these predictions to limit the amount of power used by relay nodes within the sensor network. Some examples analyze spatial and temporal characteristics of anomalous sensor readings to predict future occurrences. In these examples, the relay nodes operate in a reduced power mode for periods of time in which anomalous sensor readings are not predicted to occur. Also, in these examples, only relay nodes in a path between a sensor predicting an anomalous reading and a gateway of the sensor network operate in full power mode. This feature allows other relay nodes to remain in the reduced power mode even when an anomalous sensor reading is predicted elsewhere in the sensor network.

25 Claims, 5 Drawing Sheets

(56) References Cited

U.S. PATENT DOCUMENTS

| | | | |
|---|---|---|---|
| 2017/0265817 A1* | 9/2017 | Takamatsu | A61B 5/00 |
| 2018/0034694 A1* | 2/2018 | Farnham | H04W 4/38 |
| 2018/0123893 A1* | 5/2018 | Ahmed | H04L 41/12 |
| 2018/0146489 A1* | 5/2018 | Jin | H04B 7/022 |
| 2018/0146507 A1* | 5/2018 | Tsuda | H04W 68/005 |
| 2018/0326968 A1* | 11/2018 | Geller | B60W 20/11 |

* cited by examiner

SCHEDULING OF NETWORK RELAYS

BACKGROUND

Spatially-distributed wireless sensor networks (WSN) are widely-deployed in Internet of Things (IoT) applications such as environmental monitoring systems, traffic and parking monitoring systems, and utility monitoring systems. One functional requirement of these systems is to capture anomalous or abnormal readings in the WSN and report these anomalous readings to a gateway with a time-bound latency period. This latency period is defined by the specific IoT application. For example, in some cold chain logistics applications, the sensor nodes must report anomalous temperature readings to the gateway within 1 minute. Short latency periods such as this significantly increase power consumption within a WSN because relay nodes within the WSN along the routing path to the gateway must continuously operate to receive, send, or route anomalous temperature readings to comply with the latency period. A continuously operating relay node may consume much higher power, e.g. nearly 4 times more power than an edge node in a mesh WSN in some configurations. For this reason, relay nodes can dominate WSN power draw and shorten its operating lifetime.

DETAILED DESCRIPTION

The systems and methods disclosed herein accurately predict the occurrence of anomalous sensor readings within a sensor network and advantageously use these predictions to limit the amount of power used by relay nodes within the sensor network. In some embodiments, the systems and methods disclosed herein analyze spatial and temporal characteristics of anomalous sensor readings to predict future occurrences. In these embodiments, the relay nodes operate in a reduced power mode for periods of time in which anomalous sensor readings are not predicted to occur. Also, in these embodiments, only relay nodes in a path between a sensor predicting an anomalous reading and a gateway of the sensor network operate in full power mode. This feature allows other relay nodes to remain in the reduced power mode even when an anomalous sensor reading is predicted elsewhere in the sensor network. These advantages enable the entire sensor network to consume less power than conventional sensor networks, in which relay nodes continuously operate in a full power mode.

Some embodiments are directed to a sensor network that includes sensor nodes, relay nodes, and a gateway. The sensor nodes include environmental sensors that acquire sensor readings to measure one or more characteristics of the environment of the sensor network. The sensor nodes transmit data descriptive of the acquired sensor readings to relay nodes. These relay nodes receive the data and transmit it to the gateway. The gateway connects the sensor network one or more other communications networks and transmits the data and/or summaries of the data to the other communication networks.

In some embodiments, each of the sensor nodes includes a modeling component and each of the relay nodes includes a scheduling component. These modeling and scheduling components work in combination to ensure that all anomalous sensor readings are predicted, acquired, and relayed to the gateway. More particularly, the modeling component is preconfigured to execute a modeling process that predicts future anomalous sensor readings. Where the modeling process predicts a future anomalous sensor reading, the modeling process generates and transmits one or more duty cycle requests to one or more relay nodes in a path between the sensor node and the gateway. In some embodiments, these duty cycle requests include information descriptive of a duty cycle and duration requested by the sensor node to enable the one or more relay nodes to be in a full power mode at the time that the anomalous sensor reading is acquired.

The modeling process may be based upon any number of forecasting techniques, such as time series methods, artificial intelligence methods, and simulation methods. For instance, in some embodiments, the modeling process may implement polynomial curve fitting, neural networks, and/or decision trees. In at least one embodiment, the modeling process implements a regression method. In some embodiments, the modeling component periodically reconfigures the modeling process to improve it by comparing actual sensor readings to previously predicted sensor readings and adjusting the modeling process to decrease the error between the actual sensor readings and sensor readings predicted by the modeling process.

In some embodiments, scheduling component is configured to receive and process duty cycle requests to implement the duty cycle and schedule requested therein. For instance, when executing according to this configuration in at least one embodiment, the scheduling component receives duty cycle requests, parses the requests to identify the requested duty cycle and duration, and alters configuration information of the relay node executing the scheduling component to implement the requested duty cycle and duration. In so doing, the scheduling component may alter the operation of the relay node from a reduced power mode to a full power mode for the requested duration, thereby enabling the relay node to receive, process, and forward any predicted anomalous sensor readings should they occur. At the expiration of the requested schedule, the scheduler reverts the configuration information of the relay node to it previous state. This reconfiguration causes the relay node to operate in its reduced power mode, thereby saving power relative to conventional, always-on, relay nodes.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. References to "an embodiment," "other embodiments," "an example," "some embodiments," "some examples," "an alternate embodiment," "various embodiments," "one embodiment," "at least one embodiment," "another embodiment," "this and other embodiments" or the like are not necessarily mutually exclusive and are intended to indicate that a particular feature, structure, or characteristic described in connection with the embodiment or example may be included in at least one embodiment or example. The appearances of such terms herein are not necessarily all referring to the same embodiment or example. Any embodiment or example disclosed herein may be combined with any other embodiment or example.

Also, the phraseology and terminology used herein is for the purpose of description and should not be regarded as limiting. Any references to examples, embodiments, components, elements, or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

General Overview

Power consumption by relay nodes operating in full power mode is often wasteful because WSNs ordinarily operate under normal, non-anomalous conditions. Previous work has explored the use of custom hardware features, such as wake-up radios, to decrease relay node power consumption, but this previous work fails to take advantage of the properties of the sensor data field to save WSN power.

Thus, and in accordance with at least some embodiments disclosed herein, a sensor network implements predictive processes that are based on characteristics of the sensor data field generated by the sensor network. In these embodiments, the sensor network intelligently controls duty cycles of relay nodes to cut power consumption of the sensor network while, meeting stringent low-latency anomaly reporting requirements. These predictive processes may include learning-based models that exploit data characteristics of the sensor field and consequently predict anomalies in the sensor network in advance of any anomalous sensor readings. In these embodiments, duty cycles of relay nodes in the sensor network are tuned to data streams predicted to be acquired by sensor nodes. As part of this tuning, the relay nodes are dynamically set to longer reduced power mode schedules, which significantly reduces the idle-listening power draw of the relay nodes. As another part of this tuning, the relay nodes are dynamically set to shorter full power mode schedules that cover predicted anomalous sensor readings, which prevents anomalous sensor reading from going unreported. Additionally, at least some embodiments disclosed herein are software-based and, thus, do not require any special hardware to be implemented within a sensor network.

System Architecture

Figure 1:
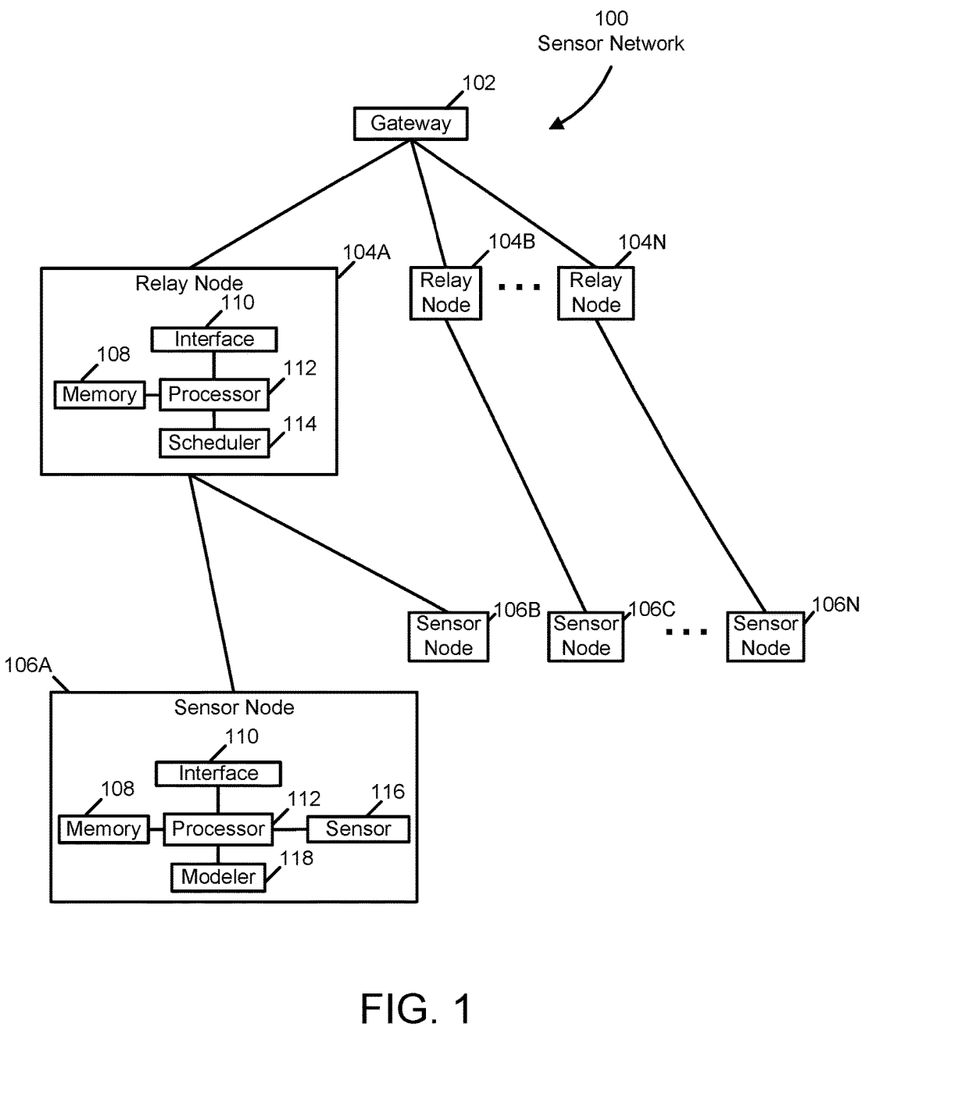
FIG. 1 is a block diagram illustrating a sensor network configured in accordance with an embodiment of the present disclosure.

FIG. 1 illustrates a sensor network 100 including a gateway 102, a plurality of relay nodes 104A through 104N and a plurality of sensor nodes 106A through 106N. The nodes of the sensor network 100 may include, for example, one or more IoT devices. As shown in FIG. 1, each of the relay nodes 104A through 104N include memory 108, at least one interface 110, at least one processor 112, and at least one scheduler 114. Each of the sensor nodes 106A through 106N include memory 108, at least one interface 110, at least one processor 112, and at least one modeler 118.

As illustrated in FIG. 1, each memory 108 may incorporate volatile and/or non-volatile data storage (e.g., read-only memory, random access memory, flash memory, magnetic/optical disk, and/or some other computer readable and writable medium) that is readable and/or writable by one of the processors 112. The memory 108 is sized and configured to store programs executable by one of the processors 112 and at least some of the data used by the programs during execution. Each of the processors 112 includes various computing circuitry, such as an arithmetic-logic unit and register memory, that can execute instructions defined by an instruction set supported by the processor 112. Each of the processors 112 may include a single core processor, a multi-core processor, a micro-controller, or some other data processing device. Each of the interfaces 110 includes communications circuitry, such as a wired or wireless Ethernet port, that enables one of the processors 112 to communicate with other processors 112 in the sensor network 100. Each of the sensors 116 includes analogue and/or digital circuitry that can sample the operating environment near the sensor 116 and measure some characteristic of the operating environment. For example, each of the sensors may include a temperature sensor, a barometer, an accelerometer, or some other sensor.

In some embodiments, each of the relay nodes 104A through 104N is configured to operate in, at least, a full power mode and a reduced power mode. When operating in a full power mode, a relay node monitors for, receives, and processes inbound communications. When operating in a reduced power mode, the relay node does not monitor for, receive, and/or process at least some inbound communications. Rather when operating in a reduced power mode, the relay node executes processes that are necessary for it to identify when a transition to the full power mode is warranted. These processes may include monitoring the interface 110 for special types of inbound communications and/or simply executing a timer that expires when the relay node should transition to the full power mode.

As shown in FIG. 1, each of the schedulers 114 includes software and/or hardware that is executable by one of the processors 112 and configured to receive and process duty cycle requests from one or more of the sensor nodes 106A through 106N. In some embodiments, these duty cycle requests include information descriptive of a duty cycle requested by a sensor node for a relay node. For instance, in some embodiments, the duty cycle requests include one or more fields that define a requested duty cycle. Examples of duty cycles that may be requested include continuous duty cycles and periodic duty cycles. A relay node executing according to a continuous duty cycle operates in either the full power mode or the reduced power mode. A relay node executing according to a periodic duty cycle alternates between the full power mode and the reduced power mode in accordance with a specified time period (e.g., 1 minute in full power mode followed by 4 minutes in reduced power mode). Other types of duty cycles are contemplated (e.g., an aperiodic duty cycle) and the embodiments described herein are not limited to a particular duty cycle.

In some embodiments, the duty cycle requests also include at least one field that defines a total duration for the requested duty cycle. This duration field stores information specifying a total period of time that the requested duty cycle should be executed prior to returning to the previous or default duty cycle. In some embodiments, the default duration included in duty cycle requests is equal to a period of time over which a sensor node has predicted future sensor readings. This period of time is referred to herein as a "prediction horizon." In addition, in at least one embodiment, the duty cycle requests do not include fields storing actual duty cycle information as described above, but rather include an identifier of a pre-defined duty cycle stored in the memory 108 of the relay node. This pre-defined duty cycle may include information similar to a duty cycle request, as described above.

In receiving and processing duty cycle requests in some embodiments, each of the schedulers 114 parses each request, identifies a requested duty cycle, and manipulates configuration data stored in the memory 108 of the relay node in which the scheduler 114 resides to setup the requested duty cycle. In some embodiments, where the duty cycle request includes a duration field, each of the schedulers 114 is configured to identify the duration field and manipulate the configuration data to execute the requested duty cycle for the requested duration. One example of a scheduling process executed by each of the schedulers 114 in some examples is described further below with reference to FIG. 3.

As shown in FIG. 1, each of the modelers 118 includes software and/or hardware that is executable by one of the processors 112 and configured to predict anomalous sensor readings over a prediction horizon (e.g., 4 minutes from the current time). In predicting anomalous sensor readings in some embodiments, each of the modelers 118 executes a modeling process. This modeling process may be trained using actual or synthetically derived data as part of an overall anomaly prediction process that is described further below with reference to FIGS. 2 and 5. This training data may include data representative of a variety of anomaly scenarios (e.g., host spot anomaly, door open anomaly, air conditioning failure anomaly, etc.). While a variety of modeling processes can be used, in at least one embodiment each of the modelers 118 executes a regression model to predict a future temperature reading from the sensor 116. Equation 1 illustrates an example regression model used in some embodiments.

$$T_{t+K} = c_0 + c_1 * T_t + c_2 * T_{t-1} + c_3 * T_{t-2} + \ldots + c_{P+1} * T_{t-P} \quad \text{Equation 1}$$

In equation 1, $T_t$, $T_{t-1}$, $T_{t-2}$ ... $T_{t-P}$ are the historical temperature readings and coefficients $C_0$, $C_1$, $C_2$, $C_3$, $C_4$ ..., $C_P$ are the parameters calculated during execution of a training process to minimize the error between predicted temperatures and true temperatures in training data. Equation 1 predicts the temperature at time t+K with K representing the prediction horizon. Examples of such training processes are described further below with reference to FIGS. 2, 4, and 5.

In some embodiments, each of the modelers 118 is configured to declare that an anomalous sensor reading is imminent where the modeling process predicts one or more sensor readings that meet one or more predefined criterion. Examples of one or more sensor readings meeting predefined criterion include a sensor reading transgressing a threshold value, a plurality of sensor readings acquired within a predefined time window transgressing a threshold value, and a plurality of sensor readings within a predefined time window that have a variance that transgresses a threshold variance.

In some embodiments where the modeling process predicts future temperature readings, each of the modelers 118 is configured to declare that an anomalous temperature reading is imminent where a future temperature (e.g., $T_{t+K}$) predicted by the modeling process exceeds a threshold value (e.g., 15 degrees Celsius). In other embodiments, one or more of the modelers 118 are configured to declare that an anomalous temperature reading is imminent where the future temperature predicted by the model process exceeds a threshold value that is adjusted by a relaxation factor. In these embodiments, the relaxation factor is designed to eliminate false negatives (i.e. failure to declare an imminent anomalous temperature reading where one occurs) at the cost of generating false positives (i.e., declaring an imminent anomalous temperature reading where one fails to occur). Values of relaxation factors may be determined empirically and may equal, for example, a boundary set at two standard deviations from the average sensor reading value.

In some embodiments, each of the modelers 118 is configured to generate and transmit one or more duty cycle requests (as described above) in response to declaring an imminent anomalous sensor reading. These duty cycle requests may be addressed to relay nodes on a path between a sensor node declaring the imminent anomalous sensor reading and the gateway 102. In some embodiments, these duty cycle requests include a requested duty cycle that places relay nodes that process the requests into their full power mode during a period of time that covers the predicted timing of the imminent anomalous sensor reading.

In some embodiments, each of the modelers 118 is configured to execute a training process that refines the modeling process using actual sensor readings as they become available for comparison to sensor readings previously predicted by the modeling process. One example of such a training process is described further below with reference to FIG. 3. In addition, further examples of processes executed by each of the modelers 118 in accordance with the configurations described above are provided below in association with FIGS. 2 and 4.

While FIG. 1 illustrates the modelers 118 as residing within the sensor nodes, in other embodiments, a single modeler 118 resides within and is executed by the gateway 102. Additionally, it is appreciated that the gateway 102, one or more of the relay nodes 104A through 104N, and one or more of the sensor nodes 106A through 106N may be implemented using a computing device, such as the computing device described below with reference to FIG. 5.

Methodology

Figure 2:
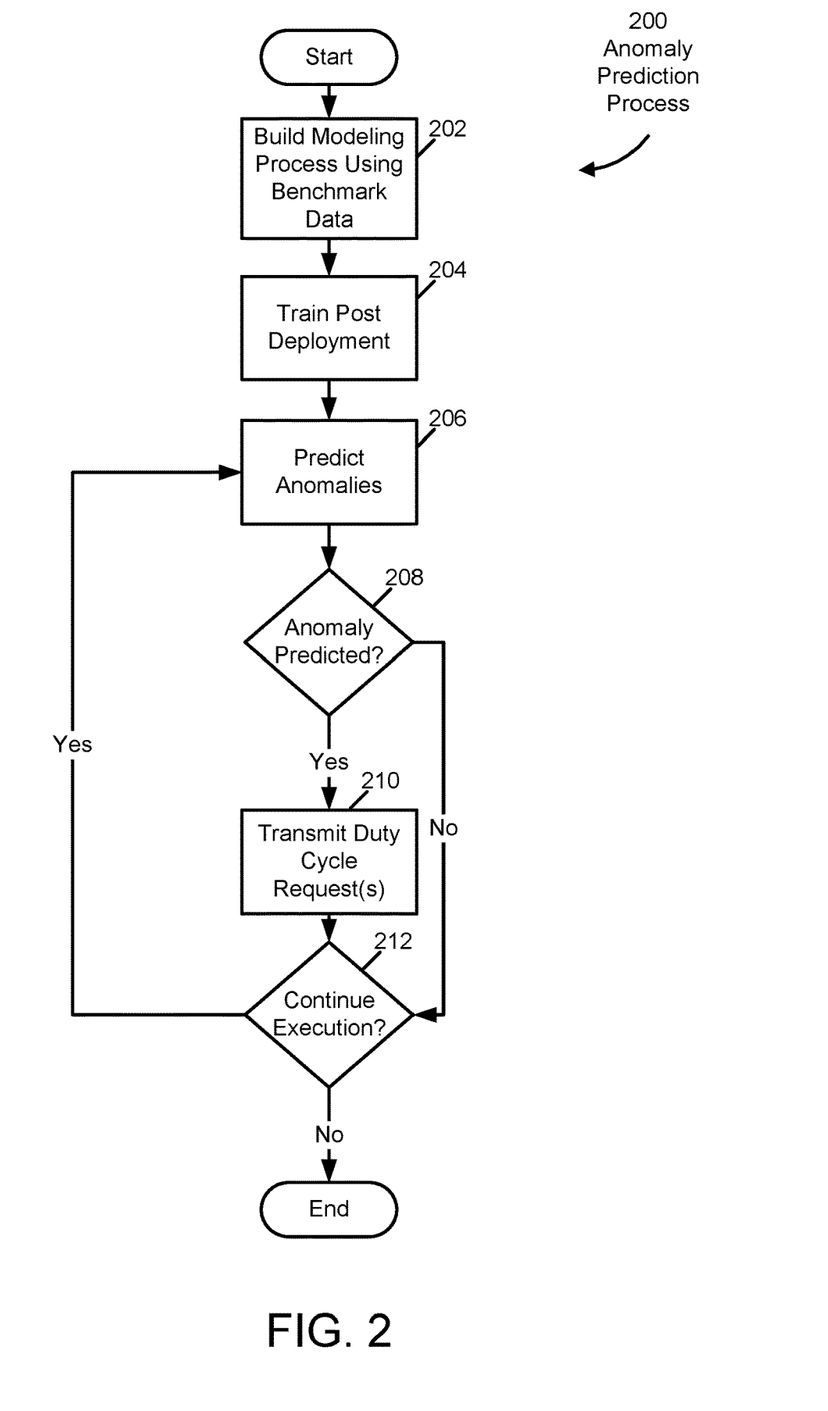
FIG. 2 is a flow diagram illustrating an anomaly prediction process in accordance with an embodiment of the present disclosure.

Some embodiments disclosed herein execute an anomaly prediction process, such as the anomaly prediction process 200 illustrated in FIG. 2. The anomaly prediction process 200 may be executed by a sensor network, such as the sensor network 100 described above with reference to FIG. 1. The acts executed by the anomaly prediction process 200 collectively build, deploy, and operate a sensor network that conserves power by predicting occurrences of anomalies and controlling power usage within the sensor network to match these predicted occurrences.

As illustrated in FIG. 2, the anomaly prediction process 200 starts in act 202 with a computing device, such as the computing device 500 described further below with reference to FIG. 5, building a process to modeling sensor readings using benchmark data. This benchmark data may include historical sensor readings and/or sensor readings generated synthetically by a simulation. For instance, in embodiments where the environmental characteristics being monitored by the sensor network include temperature, the benchmark data may include historical sensor readings and/or data generated by a computational fluid dynamics simulation of an environment in which the sensor network is to be installed. In some embodiments, the computing device uses regression analysis to build the modeling process. For instance, the computing device may build equation 1 by generating the coefficients to minimize error between future temperatures predicted by equation 1 as compared to temperatures included in the benchmark data. After the modeling process is built, it is installed within each of the sensor nodes of the sensor network as modelers (e.g. the modelers 118).

In act 204, the sensor network is deployed to its designated environment and, in some embodiments, the modeling process is further trained using actual sensor readings acquired from the environment. For example, in embodiments where the environmental characteristics being monitored by the sensor network include temperature, the coefficients of equation 1 may be further adjusted to minimize error between future temperatures predicted by equation 1 as compared to temperatures included actual temperature sensor readings acquired from the environment.

In act 206, the sensor network is placed into operation and at least one modeler (e.g. the modeler housed within the sensor node 106A) executes the modeling process to predict anomalous sensor readings. In act 208, the modeler determines whether an anomalous sensor reading is imminent. If so, the modeler executes act 210. Otherwise, the modeler executes act 212.

In the act 210, the modeler generates and transmits a duty cycle request to one or more relay nodes (e.g., one or more of the relay nodes 104A through 104N) within a path between the sensor node housing the modeler and a gateway (e.g., the gateway 102). These duty cycle requests include a duty cycle that covers the predicted timing of the imminent anomalous sensor reading.

In the act 212, the modeler determines whether to continue execution. For example, the modeler may check communications from an operating system executing on the sensor node to determine whether a shutdown has been requested. If the modeler determines that execution should continue, the modeler returns to the act 206. Otherwise the modeler terminates the anomaly prediction process 200.

Figure 3:
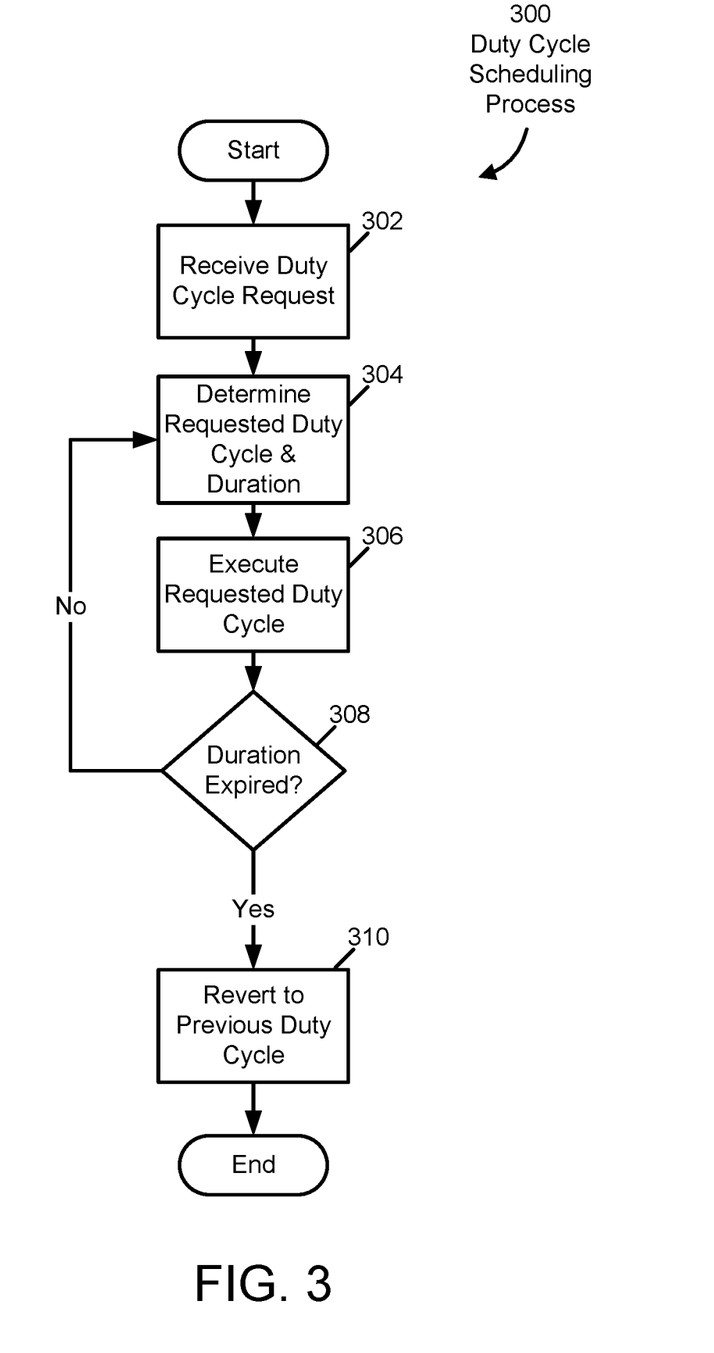
FIG. 3 is a flow chart illustrating a duty cycle scheduling process in accordance with an embodiment of the present disclosure.

Some embodiments disclosed herein execute a duty cycle scheduling process, such as the duty cycle scheduling process 300 illustrated in FIG. 3. The duty cycle scheduling process 300 may be executed by a relay node, such any of the relay nodes 104A through 104N described above with reference to FIG. 1. The acts executed by the duty cycle scheduling process 300 collectively enable a relay node to conserve power by executing in a reduced power mode except for periods of time in which the relay node is predicted to receive anomalous sensor readings from one or more sensor nodes, such as any of the sensor nodes 106A through 106N described above with reference to FIG. 1. During these periods of time the relay node executes in a full power mode, as directed by the one or more sensor nodes via one or more duty cycle requests.

As illustrated in FIG. 3, the duty cycle scheduling process 300 starts in act 302 with the relay node receiving a duty cycle request from a sensor node via an interface (e.g., the interface 110 of the relay node 104A). In act 304, a processor (e.g., the processor 112) of the relay node parses the duty cycle request to determine the requested duty cycle and duration. For example, the processor may parse the duty cycle request to identify a periodic cycle during which the relay node operates in the full power mode for 5 minutes. In act 306, the relay node executes the requested duty cycle. This act may include the processor altering configuration information stored in a memory (the memory 108) of the relay node to implement the requested duty cycle.

In act 308, the processor determines whether the duration for the currently executing duty cycle has expired. If so, the processor executes act 310. Otherwise, the processor executes act 304. In the act 310, the processor reverts the relay node to its previous or default duty cycle and the duty cycle scheduling process 300 ends. In some embodiments, within the act 310, the processor alters the configuration information to implement the previous or default duty cycle. For instance, within the act 310 the processor may revert the duty cycle to a continuous mode operating at reduced power.

Figure 4:
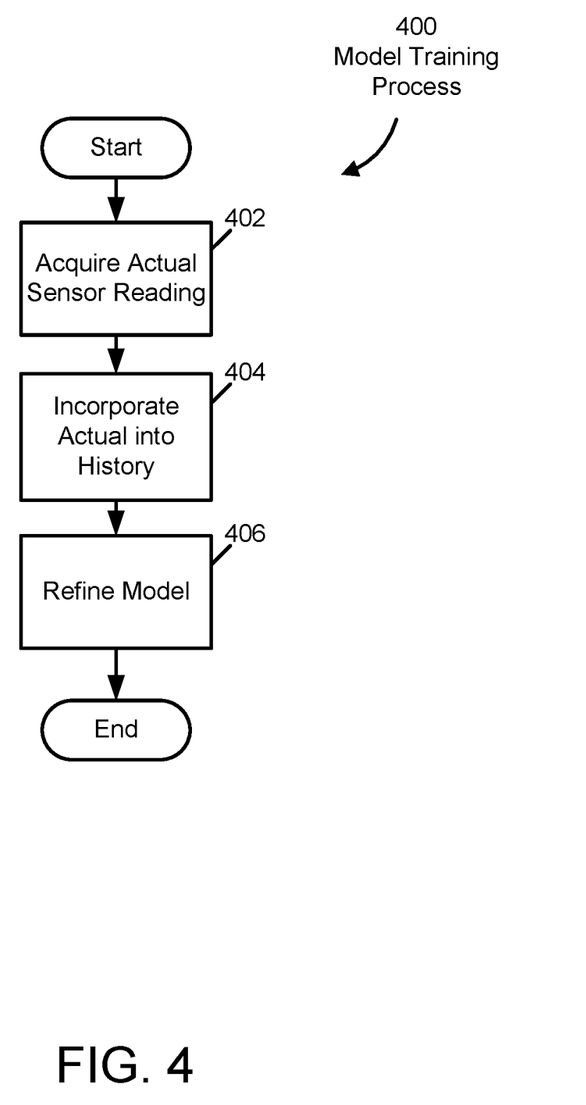
FIG. 4 is a flow chart illustrating a model training process in accordance with an embodiment of the present disclosure.

Some embodiments disclosed herein execute a model training process, such as the model training process 400 illustrated in FIG. 4. The model training process 400 may be executed by a sensor node, such any of the sensor nodes 106A through 106N described above with reference to FIG. 1. The acts executed by the model training process 400 collectively enable a sensor node to refine the modeling process used to predict anomalous sensor readings.

As illustrated in FIG. 4, the model training process 400 starts in act 402 with the sensor node acquiring a sensor reading from a sensor (e.g., the sensor 116). In act 404, a processor (e.g., the processor 112) of the sensor node incorporates the sensor reading into a set of historical sensor readings stored in a memory (e.g., the memory 108) of the sensor node. In act 406, the processor refines a modeling process used to predict anomalous sensor readings and the model training process 400 ends. In some examples, this refining process is executed periodically during operation of the sensor node and calculates parameters of the modeling process (e.g., coefficients in regression modes, links and weights in neural network models, etc.) that minimize error between predicted sensor readings and actual sensor reading acquired during operation and stored in the set of historical sensor readings.

Processes 200 through 400 each depict one particular sequence of acts in a particular example. The acts included in these processes may be performed by, or using, one or more computing devices specially configured as discussed herein. Some acts are optional and, as such, may be omitted in accord with one or more examples. Additionally, the order of acts can be altered, or other acts can be added, without departing from the scope of the systems and methods discussed herein. Furthermore, it is appreciated that optimization techniques, such as power-efficient data gathering and load balancing (e.g., via compressive sampling) can be used in conjunction with the other processes described herein without departing from the scope of the present disclosure.

Computing Device

Figure 5:
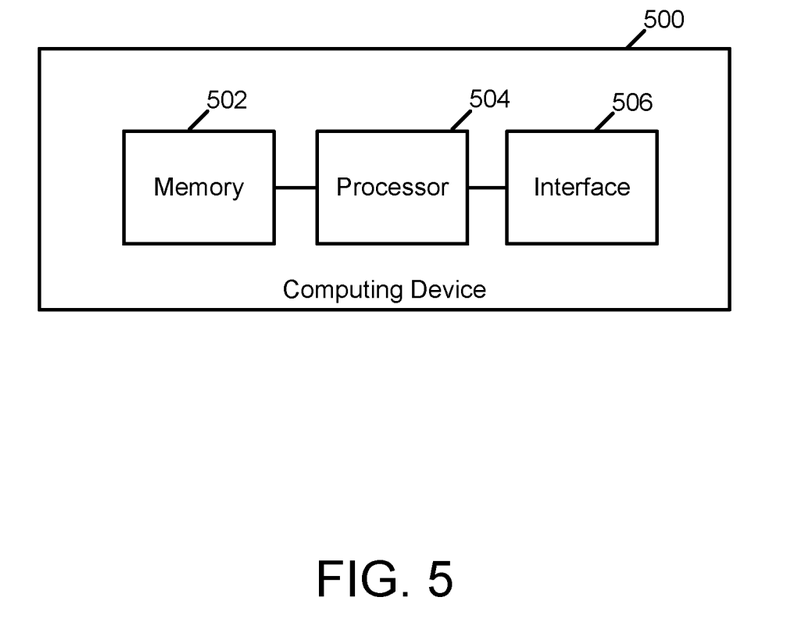
FIG. 5 is a block diagram of a computing device that may be used to implement various components of a sensor network in accordance with an embodiment of the present disclosure.

FIG. 5 illustrates a computing device 500 that can be used to implement various components of a sensor network as described herein. As shown, the computing device 500 includes memory 502, at least one processor 504, and at least one interface 506. Although the particular types and models of these components may vary between computing devices, it is appreciated that each computing device includes a processor, memory, and an interface.

The interface 506 includes one or more physical interface devices such as input devices, output devices, and combination input/output devices and a software stack configured to drive operation of the devices. Interface devices may receive input or provide output. More particularly, output devices may render information for external presentation and input devices may accept or generate information from external sources. Examples of interface devices include keyboards, mouse devices, trackballs, microphones, touch screens, printing devices, display screens, speakers, network interface cards, environmental sensors, and the like. Interface devices allow programmable devices to exchange information and communicate with external entities, such as users and other systems.

The memory 502 includes volatile and/or non-volatile (i.e., non-transitory or non-transient) data storage that is readable and/or writeable by the processor 504. The memory 502 stores programs and data used or manipulated during operation of the computing device 500. The programs stored in the memory 502 are a series of instructions that are executable by the at least one processor 504. The memory 502 may include relatively high performance data storage, such as registers, caches, dynamic random access memory, and static memory. The memory 502 may further include a relatively low performance, non-volatile, computer readable and/or writable data storage medium such as flash memory or an optical or magnetic disk. Various embodiments may organize the memory 502 into particularized and, in some cases, unique structures to store data in support of the components disclosed herein. These data structures may be specifically configured to conserve storage space or increase data exchange performance and may be sized and organized to store values for particular data and types of data.

To implement and/or control specialized components in some embodiments, the processor 504 executes a series of instructions (i.e., one or more programs) that result in manipulated data. The processor 504 may be any type of processor, multiprocessor, microprocessor, or controller known in the art. The processor 504 is connected to and communicates data with the memory 502 and the interfaces 506 via an interconnection mechanism, such as a bus or some other data connection. This interconnection mechanism is represented in FIG. 5 by lines connecting the components within the computing device. In operation, the processor 504 causes data and/or encoded instructions to be read from a non-volatile data storage medium in the memory 502 and written to high performance data storage. The processor 504 manipulates the data and/or executes the encoded instructions within the high-performance data storage and copies the manipulated data to the data storage medium after processing is completed.

Although the computing device 500 is shown as an example of a computing device capable of executing the processes disclosed herein, embodiments are not limited to the computing device shown in FIG. 5. For example, various processes may be executed by one or more computing devices having a different architectures or components than those shown in FIG. 5. For instance, a programmable device may include specially programmed, special-purpose hardware, such as an application-specific integrated circuit (ASIC), a field-programmable gate array (FPGA), a complex programmable logic device (CPLD), and other implementations in silicon or other hardware tailored to execute processes disclosed herein. Thus, components of a computing device as disclosed herein may be implemented in software, hardware, firmware, or any combination thereof.

For example, as described above, the processor 504 may be general purpose processor. However, when executing a specific software process as described herein (e.g., as depicted in any of FIGS. 2-4), the processor 504 becomes a special purpose processor capable of making specific logic-based determinations based on input data received, and further capable of providing one or more outputs that can be used to control or otherwise inform subsequent processing to be carried out by the processor 504 and/or other processors or circuitry with which processor 504 is communicatively coupled. The processor 504 reacts to specific input stimulus in a specific way and generates a corresponding output based on that input stimulus. In this sense, the structure of processor 504 according to one embodiment is defined by the processes shown in any of FIGS. 2-4. Moreover, in some example cases, the processor 504 proceeds through a sequence of logical transitions in which various internal register states and/or other bit cell states internal or external to the processor 504 may be set to logic high or logic low. This specific sequence of logic transitions is determined by the state of electrical input signals to the processor 504 and a special-purpose structure is effectively assumed by the processor 504 when executing each software instruction of the processes shown in FIGS. 2-4. Specifically, those instructions anticipate the various stimulus to be received and change the implicated memory states accordingly. In this way, the processor 504 may generate and store or otherwise provide useful output signals. Thus, it is appreciated that the processor 504, during execution of a software process becomes a special purpose machine, capable of processing only specific input signals and rendering specific output signals based on the one or more logic operations performed during execution of each instruction. In at least some examples, the processor 504 is configured to execute a function where software is stored in a data storage device coupled with the processor 504 (e.g., the memory 502) and that software is configured to cause the processor 504 to proceed through a sequence of various logic operations that result in the function being executed.

Further Example Embodiments

The following examples pertain to further embodiments, from which numerous permutations and configurations will be apparent.

Example 1 is a relay node comprising: a memory storing configuration information specifying that the relay node periodically operate in a reduced power mode; a network interface; and at least one processor coupled to the memory and the network interface. The at least one processor is configured to: receive, via the network interface, a duty cycle request; reconfigure the configuration information to specify that the relay node operate as specified in the duty cycle request; and operate the relay node as specified in the configuration information.

Example 2 includes the subject matter of Example 1, wherein the at least one processor is further configured to: receive sensor data from a sensor node via the network interface; and transmit the sensor data to a gateway.

Example 3 includes the subject matter of Example 1 or Example 2, wherein the duty cycle request specifies that the relay node operate in full power mode for a duration.

Example 4 includes the subject matter of Example 3, wherein the at least one processor is further configured to reconfigure the configuration information to specify that the relay node periodically operate in the reduced power mode in response to expiration of the duration.

Example 5 is a sensor node comprising: a memory; a network interface; a sensor configured to acquire at least one sensor reading; and at least one processor coupled to the memory and the network interface. The at least one processor is and configured to: predict at least one future sensor reading; compare the at least one future sensor reading to at least one predefined criterion; and in response to the at least one future sensor reading meeting the at least one predefined criterion: generate a duty cycle request; and transmit the duty cycle request to at least one relay node.

Example 6 includes the subject matter of Example 5, wherein the at least one predefined criterion comprises a threshold value and the at least one future sensor reading meeting the at least one predefined criterion comprises the at least one future sensor reading transgressing the threshold value.

Example 7 includes the subject matter of Example 5 or Example 6, wherein the at least one future sensor reading comprises a plurality of future sensor readings acquired within a predefined time window, the at least one predefined criterion comprises a threshold value, and the at least one future sensor reading meeting the at least one predefined criterion comprises each future sensor reading of the plurality of future sensor readings transgressing the threshold value.

Example 8 includes the subject matter of any of Examples 5-7, wherein the at least one future sensor reading comprises a plurality of future sensor readings acquired within a predefined time window, the at least one predefined criterion comprises a threshold variance, and the at least one future sensor reading meeting the at least one predefined criterion comprises a variance of the plurality of future sensor readings transgressing the threshold variance.

Example 9 includes the subject matter of any of Examples 5-8, wherein the at least one processor is configured to predict the at least one future sensor reading at least in part by executing a model that predicts future sensor readings within a prediction horizon and is further configured to generate the duty cycle request to comprise a duration equal to the prediction horizon.

Example 10 includes the subject matter of Example 9, wherein the model comprises one or more of a regression model, a polynomial curve fitting model, a neural network model, and a decision tree model.

Example 11 includes the subject matter of Example 9 or Example 10, wherein the at least one processor is further configured to: receive the at least one sensor reading; and refine the model using the at least one future sensor reading and the at least one sensor reading.

Example 12 is a sensor network comprising at least one relay node and at least one sensor node. The at least one relay node is configured to: operate, periodically, in a reduced power mode; receive a duty cycle request; and operate as specified in the duty cycle request. The at least one sensor node is configured to: predict at least one future anomalous sensor reading; generate the duty cycle request in response to predicting the at least one future anomalous sensor reading; and transmit the duty cycle request to the at least one relay node.

Example 13 includes the subject matter of Example 12, further comprising a gateway, wherein the at least one relay node is further configured to: receive sensor data from the at least one sensor node; and transmit the sensor data to the gateway.

Example 14 includes the subject matter of Example 12 or Example 13, wherein the duty cycle request specifies that the at least one relay node operate in full power mode for a duration.

Example 15 includes the subject matter of Example 14, wherein the at least one relay node is further configured to periodically operate in the reduced power mode in response to expiration of the duration.

Example 16 includes the subject matter of any of Examples 12-13, wherein the at least one sensor node is further configured to predict the at least one future anomalous sensor reading at least in part by executing a model that predicts future sensor readings within a prediction horizon and is further configured to generate the duty cycle request to comprise a duration equal to the prediction horizon.

Example 17 includes the subject matter of Example 16, wherein the model comprises one or more of a regression model, a polynomial curve fitting model, a neural network model, and a decision tree model.

Example 18 includes the subject matter of Example 16 or Example 17, wherein the at least one sensor node is further configured to: acquire at least one sensor reading; and refine the model using the at least one future anomalous sensor reading and the at least one sensor reading.

Example 19 is a method of controlling power consumed by a sensor network comprising at least one relay node and at least one sensor node. The method comprises acts of operating the at least one relay node in a reduced power mode; predicting at least one future anomalous sensor reading at the at least one sensor node; and operating the at least one relay node in a full power mode in response to predicting the at least one future anomalous sensor reading.

Example 20 includes the subject matter of Example 19, wherein operating the at least one relay node in full power mode comprises: generating a duty cycle request in response to predicting the at least one future anomalous sensor reading; transmitting the duty cycle request to the at least one relay node; receiving, by the at least one relay node, the duty cycle request; and operating the at least one relay node as specified in the duty cycle request.

Example 21 includes the subject matter of Example 20, wherein operating the at least one relay node as specified in the duty cycle request comprises operating the at least one relay node in the full power mode for a duration specified in the duty cycle request and the method further comprises operating the at least one relay node in the reduced power mode in response to expiration of the duration.

Example 22 includes the subject matter of any of Examples 19-21, wherein predicting the at least one future anomalous sensor reading includes executing a model that predicts future sensor readings within a prediction horizon.

Example 23 includes the subject matter of Example 22, wherein executing the model comprises executing one or more of a regression model, a polynomial curve fitting model, a neural network model, and a decision tree model.

Example 24 includes the subject matter of Example 22 or Example 23, further comprising: acquiring at least one sensor reading; and refining the model using the at least one future anomalous sensor reading and the at least one sensor reading.

Example 25 includes the subject matter of Example 24, wherein acquiring the at least one sensor reading comprises acquiring at least one temperature sensor reading.

Example 26 is a non-transient computer readable medium encoded with instructions that when executed by one or more processors cause a process for controlling power consumed by a sensor network including a relay node to be carried out. The process comprising acts of: operating, periodically, the relay node in a reduced power mode; receiving, by the relay node, a duty cycle request; reconfiguring configuration information stored on the relay node to specify that the relay node operate as specified in the duty cycle request; and operating the relay node as specified in the configuration information.

Example 27 includes the subject matter of Example 26, wherein the process further comprises: receiving, by the relay node, sensor data from a sensor node; and transmitting, by the relay node, the sensor data to a gateway.

Example 28 includes the subject matter of Example 26 or Example 27, wherein the duty cycle request specifies that the relay node operate in full power mode for a duration.

Example 29 includes the subject matter of Example 28, wherein the process further comprises reconfiguring the configuration information to specify that the relay node periodically operate in the reduced power mode in response to expiration of the duration.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

The invention claimed is:

1. A relay node comprising:
a memory storing configuration information specifying that the relay node periodically operate in a reduced power mode;
a network interface; and
at least one processor coupled to the memory and the network interface and configured to:
receive, via the network interface, a duty cycle request from a sensor node;
reconfigure the configuration information to specify that the relay node operate as specified in the duty cycle request; and
operate the relay node as specified in the configuration information.

2. The relay node of claim 1, wherein the at least one processor is further configured to:
receive sensor data from the sensor node via the network interface; and
transmit the sensor data to a gateway.

3. The relay node of claim 1, wherein the duty cycle request specifies that the relay node operate in full power mode for a duration.

4. The relay node of claim 3, wherein the at least one processor is further configured to reconfigure the configuration information to specify that the relay node periodically operate in the reduced power mode in response to expiration of the duration.

5. A sensor node comprising:
a memory;
a network interface;
a sensor configured to acquire at least one sensor reading; and
at least one processor coupled to the memory and the network interface and configured to:
predict at least one future sensor reading;
compare the at least one future sensor reading to at least one predefined criterion; and
in response to the at least one future sensor reading meeting the at least one predefined criterion:
generate a duty cycle request; and
transmit the duty cycle request to at least one relay node, thereby requesting the at least one relay node to operate as specified in the duty cycle request.

6. The sensor node of claim 5, wherein the at least one predefined criterion comprises a threshold value and the at least one future sensor reading meeting the at least one predefined criterion comprises the at least one future sensor reading transgressing the threshold value.

7. The sensor node of claim 5, wherein the at least one future sensor reading comprises a plurality of future sensor readings acquired within a predefined time window, the at least one predefined criterion comprises a threshold value, and the at least one future sensor reading meeting the at least one predefined criterion comprises each future sensor reading of the plurality of future sensor readings transgressing the threshold value.

8. The sensor node of claim 5, wherein the at least one future sensor reading comprises a plurality of future sensor readings acquired within a predefined time window, the at least one predefined criterion comprises a threshold variance, and the at least one future sensor reading meeting the at least one predefined criterion comprises a variance of the plurality of future sensor readings transgressing the threshold variance.

9. The sensor node of claim 5, wherein the at least one processor is configured to predict the at least one future sensor reading at least in part by executing a model that predicts future sensor readings within a prediction horizon and is further configured to generate the duty cycle request to comprise a duration equal to the prediction horizon.

10. The sensor node of claim 9, wherein the model comprises one or more of a regression model, a polynomial curve fitting model, a neural network model, and a decision tree model.

11. The sensor node of claim 9, wherein the at least one processor is further configured to:
receive the at least one sensor reading; and
refine the model using the at least one future sensor reading and the at least one sensor reading.

12. A sensor network comprising:
at least one relay node configured to:
operate, periodically, in a reduced power mode;
receive a duty cycle request from at least one sensor node; and
operate as specified in the duty cycle request; and
the at least one sensor node, the at least one sensor node being configured to:
predict at least one future anomalous sensor reading;
generate the duty cycle request in response to predicting the at least one future anomalous sensor reading; and
transmit the duty cycle request to the at least one relay node, thereby requesting the at least one relay node to operate as specified in the duty cycle request.

13. The sensor network of claim 12, further comprising a gateway, wherein the at least one relay node is further configured to:
receive sensor data from the at least one sensor node; and
transmit the sensor data to the gateway.

14. The sensor network of claim 12, wherein the duty cycle request specifies that the at least one relay node operate in full power mode for a duration.

15. The sensor network of claim 14, wherein the at least one relay node is further configured to periodically operate in the reduced power mode in response to expiration of the duration.

16. The sensor network of claim 12, wherein the at least one sensor node is further configured to predict the at least one future anomalous sensor reading at least in part by executing a model that predicts future sensor readings within a prediction horizon and is further configured to generate the duty cycle request to comprise a duration equal to the prediction horizon.

17. A method of controlling power consumed by a sensor network comprising at least one relay node and at least one sensor node, the method comprising:
 operating the at least one relay node in a reduced power mode;
 predicting, by the at least one sensor node, at least one future anomalous sensor reading at the at least one sensor node; and
 operating the at least one relay node in a full power mode in response to predicting the at least one future anomalous sensor reading.

18. The method of claim 17, wherein operating the at least one relay node in full power mode comprises:
 generating a duty cycle request in response to predicting the at least one future anomalous sensor reading;
 transmitting the duty cycle request to the at least one relay node;
 receiving, by the at least one relay node, the duty cycle request; and
 operating the at least one relay node as specified in the duty cycle request.

19. The method of claim 18, wherein operating the at least one relay node as specified in the duty cycle request comprises operating the at least one relay node in the full power mode for a duration specified in the duty cycle request and the method further comprises operating the at least one relay node in the reduced power mode in response to expiration of the duration.

20. The method of claim 17, wherein predicting the at least one future anomalous sensor reading includes executing a model that predicts future sensor readings within a prediction horizon.

21. The method of claim 20, further comprising:
 acquiring at least one sensor reading; and
 refining the model using the at least one future anomalous sensor reading and the at least one sensor reading.

22. The method of claim 21, wherein acquiring the at least one sensor reading comprises acquiring at least one temperature sensor reading.

23. A non-transient computer readable medium encoded with instructions that when executed by one or more processors cause a process for controlling power consumed by a sensor network including a relay node to be carried out, the process comprising:
 operating, periodically, the relay node in a reduced power mode;
 receiving, by the relay node, a duty cycle request from a sensor node;
 reconfiguring configuration information stored on the relay node to specify that the relay node operate as specified in the duty cycle request; and
 operating the relay node as specified in the configuration information.

24. The computer readable medium of claim 23, wherein the duty cycle request specifies that the relay node operate in full power mode for a duration.

25. The computer readable medium of claim 24, wherein the process further comprises reconfiguring the configuration information to specify that the relay node periodically operate in the reduced power mode in response to expiration of the duration.

* * * * *